(12) United States Patent
Farre Guiu et al.

(10) Patent No.: US 10,068,616 B2
(45) Date of Patent: Sep. 4, 2018

(54) THUMBNAIL GENERATION FOR VIDEO

(71) Applicant: Disney Enterprises, Inc., Burbank, CA (US)

(72) Inventors: Miquel Angel Farre Guiu, Bern (CH); Aljoscha Smolic, Aarau (CH); Marc Junyent Martin, Barcelona (ES); Asier Aduriz, Gipuzkoa (ES); Tunc Ozan Aydin, Zurich (CH); Christopher A. Eich, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/404,028

(22) Filed: Jan. 11, 2017

(65) Prior Publication Data

US 2018/0197577 A1 Jul. 12, 2018

(51) Int. Cl.
| | |
|---|---|
| G11B 27/00 | (2006.01) |
| G11B 27/30 | (2006.01) |
| G11B 27/034 | (2006.01) |
| G11B 27/34 | (2006.01) |
| G06T 7/00 | (2017.01) |

(Continued)

(52) U.S. Cl.
CPC ......... G11B 27/3081 (2013.01); G06T 5/007 (2013.01); G06T 5/20 (2013.01); G06T 7/0002 (2013.01); G06T 7/97 (2017.01); G06T 11/60 (2013.01); G11B 27/034 (2013.01);
(Continued)

(58) Field of Classification Search
CPC ......... G06T 7/97; G06T 7/0002; G06T 11/60; G06T 5/007; G06T 5/20; G06T 2207/10016; G06T 2207/20024; G11B 27/3081; G11B 27/034; G11B 27/34
See application file for complete search history.

(56) References Cited

U.S. PATENT DOCUMENTS

| | | |
|---|---|---|
| 7,212,666 B2 | 5/2007 | Zhang |
| 7,574,069 B2 | 8/2009 | Setlur |

(Continued)

OTHER PUBLICATIONS

Rubinstein, Michael. "Discrete Approaches to Content-Aware Image and Video Retargeting." M.Sc.Dissertation, The Interdisciplinary Center, Efi Arazi School of Computer Science, Herzlia, Israel. May 21, 2009. pp. 1-85.

(Continued)

Primary Examiner — Huy Thanh Nguyen
(74) Attorney, Agent, or Firm — Farjami & Farjami LLP (57) ABSTRACT

According to one implementation, a video processing system for performing thumbnail generation includes a computing platform having a hardware processor and a system memory storing a thumbnail generator software code. The hardware processor executes the thumbnail generator software code to receive a video file, and identify a plurality of shots in the video file, each of the plurality of shots including a plurality of frames of the video file. For each of the plurality of shots, the hardware processor further executes the thumbnail generator software code to filter the plurality of frames to obtain a plurality of key frame candidates, determine a ranking of the plurality of key frame candidates based in part on a blur detection analysis and an image distribution analysis of each of the plurality of key frame candidates, and generate a thumbnail based on the ranking.

17 Claims, 6 Drawing Sheets

(51) Int. Cl.
*G06T 5/00* (2006.01)
*G06T 5/20* (2006.01)
*G06T 11/60* (2006.01)

(52) U.S. Cl.
CPC .... *G11B 27/34* (2013.01); *G06T 2207/10016* (2013.01); *G06T 2207/20024* (2013.01)

(56) References Cited

U.S. PATENT DOCUMENTS

| | | | |
|---|---|---|---|
| 7,697,785 | B2 | 4/2010 | Chiu |
| 7,840,898 | B2 | 11/2010 | Hua |
| 7,986,372 | B2 | 7/2011 | Ma |
| 8,013,229 | B2 | 9/2011 | Xu |
| 8,296,797 | B2 | 10/2012 | Olstad |
| 8,584,042 | B2 | 11/2013 | Erol |
| 8,599,219 | B2 | 12/2013 | Shechtman |
| 8,671,346 | B2 | 3/2014 | Hua |
| 9,143,823 | B2 | 9/2015 | Vuskovic |
| 9,154,761 | B2 | 10/2015 | Sipe |
| 2004/0001705 | A1* | 1/2004 | Soupliotis .......... H04N 5/23248 386/242 |
| 2008/0159403 | A1 | 7/2008 | Dunning |
| 2014/0099034 | A1* | 4/2014 | Rafati ................. G06K 9/00751 382/209 |
| 2014/0157096 | A1 | 6/2014 | Besterman |
| 2015/0302428 | A1 | 10/2015 | Lebrecht |
| 2016/0037170 | A1* | 2/2016 | Zhang ................. H04N 19/142 375/240.12 |
| 2016/0188997 | A1 | 6/2016 | Desnoyer |
| 2016/0314819 | A1* | 10/2016 | Elsner ................... G11B 27/34 |
| 2017/0011264 | A1 | 1/2017 | Smolic |

OTHER PUBLICATIONS

Choi, J. & Kim, C. Multimed Tools Appl (2016) 75: 16191. https://doi.org/10.1007/s11042-015-2926-5.

Bongwon Sub , et al. "Automatic Thumbnail Cropping and Its Effectiveness." *Proceedings of the 16th Annual ACM Symposium on User Interface Software and Technology*, Vancouver, Canada. Nov. 2003. pp. 95-104.

* cited by examiner

THUMBNAIL GENERATION FOR VIDEO

RELATED APPLICATIONS

This application is related to application Ser. No. 14/793,584, filed Jul. 7, 2015, titled "Systems and Methods for Automatic Key Frame Extraction and Storyboard Interface Generation for Video," and commonly assigned with the present application. That related application is hereby incorporated fully by reference into the present application.

BACKGROUND

Due to its nearly universal popularity as a content medium, ever more video is being produced and made available to users. As a result, the efficiency with which video content can be reviewed, edited, and managed has become increasingly important to producers of video content and consumers of such content alike. For example, improved techniques for reviewing video content, such as the use of key frames or thumbnails representative of a given shot within a video file, may reduce the time spent in video production and management, as well as the time required for a user to navigate within the video content.

In order for a key frame or thumbnail to effectively convey the subject matter of the shot it represents, the images appearing in the thumbnail, as well as the composition of those images, should be both appealing and intuitively recognizable. In addition to content and composition, however, the effectiveness of a key frame or thumbnail in conveying the subject matter of a shot may further depend on the features of the display device used to view the representative image.

SUMMARY

There are provided video processing systems and methods for performing thumbnail generation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the efficiency with which video content can be reviewed, edited, and managed has become increasingly important to producers of video content and consumers of such content alike. For example, improved techniques for reviewing video content, such as the use of key frames or thumbnails representative of a given shot within a video file, may reduce the time spent in video production and management, as well as the time required for a user to navigate within the video content.

As further stated above, in order for a key frame or thumbnail to effectively convey the subject matter of the shot it represents, the images appearing in the thumbnail, as well as the composition of those images, should be both appealing and intuitively recognizable. In addition to content and composition, however, the effectiveness of a key frame or thumbnail in conveying the subject matter of a shot may further depend on the features of the display device used to view the representative image.

The present application discloses a thumbnail generation solution that substantially optimizes the selection and generation of one or more thumbnails corresponding respectively to one or more key frames of a shot within a video file. It is noted that, as used in the present application, the term "shot" refers to a sequence of frames within the video file that are captured from a unique camera perspective without cuts and/or other cinematic transitions.

As is further described below, by ranking key frame candidates for a particular shot based in part on a blur detection analysis of each key frame candidate at multiple levels of granularity, the present application discloses a thumbnail generation solution that advantageously provides thumbnails including clear, recognizable images. By further ranking key frame candidates based in part on an image distribution analysis of each key frame candidate, the present application discloses a thumbnail generation solution that advantageously provides thumbnails including intuitively identifiable subject matter. Moreover, by yet further ranking key frame candidates based in part on display attributes of a user device, the present application discloses a thumbnail generation solution that advantageously provides thumbnails that are substantially optimized for viewing by a user.

Figure 1:
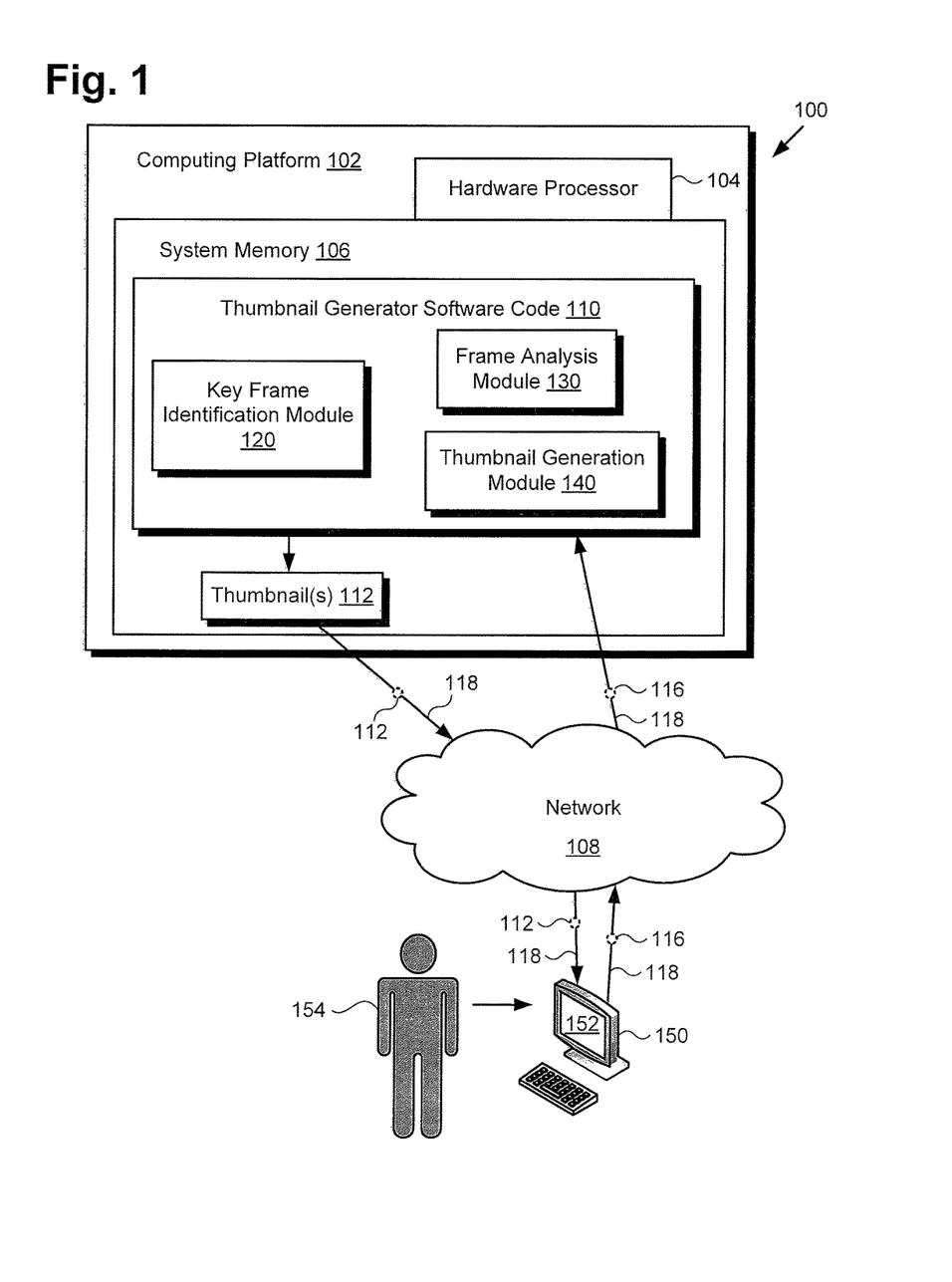
FIG. 1 shows a diagram of an exemplary video processing system for performing thumbnail generation, according to one implementation.

FIG. 1 shows a diagram of one exemplary implementation of a video processing system for performing thumbnail generation. As shown in FIG. 1, video processing system 100 includes computing platform 102 having hardware processor 104, and system memory 106 implemented as a non-transitory storage device. According to the present exemplary implementation, system memory 106 stores thumbnail generator software code 110 including key frame identification module 120, frame analysis module 130, and thumbnail generation module 140.

As further shown in FIG. 1, video processing system 100 is implemented within a use environment including communication network 108, user device 150 including display 152, and user 154 utilizing user device 150. Also shown in FIG. 1 are network communication links 118 interactively connecting user device 150 and video processing system 100 via communication network 108, video file 116, and one or more thumbnail(s) 112 generated using thumbnail generator software code 110.

It is noted that although FIG. 1 depicts thumbnail generator software code 110 including key frame identification module 120, frame analysis module 130, and thumbnail generation module 140 as being stored in its entirety in memory 106, that representation is merely provided as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various portions of thumbnail generator software code 110, such as one or more of key frame identification module 120, frame analysis module 130, and thumbnail generation module 140, may be stored and/or executed using the distributed memory and/or processor resources of video processing system 100.

According to the implementation shown by FIG. 1, user 154 may utilize user device 150 to interact with video processing system 100 over communication network 108. In one such implementation, video processing system 100 may correspond to one or more web servers, accessible over a packet network such as the Internet, for example. Alternatively, video processing system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a smart TV, laptop computer, tablet computer, digital media player, gaming console, or smartphone, for example. User 154 may utilize user device 150 to interact with video processing system 100 to use thumbnail generator software code 110, executed by hardware processor 104, to generate thumbnail(s) 112.

It is noted that, in various implementations, thumbnail(s) 112, when generated using thumbnail generator software code 110, may be stored in system memory 106 and/or may be copied to non-volatile storage (not shown in FIG. 1). Alternatively, or in addition, as shown in FIG. 1, in some implementations, thumbnail(s) 112 may be sent to user device 150 including display 152, for example by being transferred via network communication links 118 of communication network 108. It is further noted that display 152 may take the form of a liquid crystal display (LCD), a light-emitting diode (LED) display, an organic light-emitting diode (OLED) display, or another suitable display screen that performs a physical transformation of signals to light.

Figure 2:
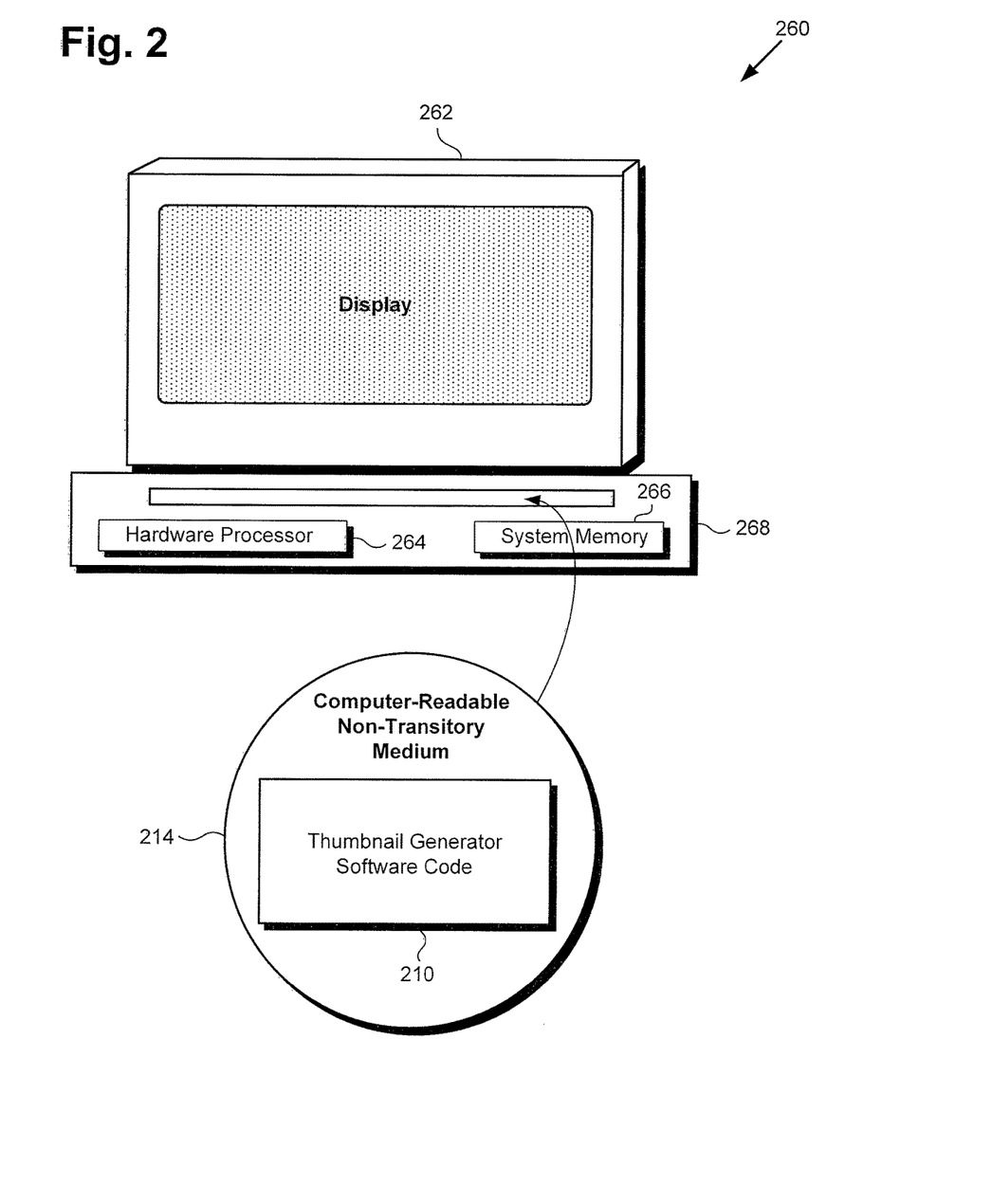
FIG. 2 shows an exemplary system and a computer-readable non-transitory medium including instructions for performing thumbnail generation, according to one implementation.

FIG. 2 shows exemplary system 260 and computer-readable non-transitory medium 214 including instructions for performing thumbnail generation, according to one implementation. System 260 includes computer 268 having hardware processor 264 and system memory 266, interactively linked to display 262. Display 262 may take the form of an LCD, LED display, an OLED display, or another suitable display screen that performs a physical transformation of signals to light. System 260 including computer 268 having hardware processor 264 and system memory 266 corresponds in general to video processing system 100 including computing platform 102 having hardware processor 104 and system memory 106, in FIG. 1. Consequently, system 260 may share any of the characteristics attributed to corresponding video processing system 100 by the present disclosure.

Also shown in FIG. 2 is computer-readable non-transitory medium 214 having thumbnail generator software code 210 stored thereon. The expression "computer-readable non-transitory medium," as used in the present application, refers to any medium, excluding a carrier wave or other transitory signal, that provides instructions to hardware processor 264 of computer 268. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides thumbnail generator software code 210 for execution by hardware processor 264 of computer 268. Thumbnail generator software code 210 corresponds in general to thumbnail generator software code 110, in FIG. 1, and is capable of performing all of the operations attributed to that corresponding feature by the present disclosure. In other words, thumbnail generator software code 210 includes a key frame identification module (not shown in FIG. 2), a frame analysis module (also not shown in FIG. 2), and a thumbnail generation module (also not shown in FIG. 3), corresponding respectively in general to key frame identification module 120, frame analysis module 130, and thumbnail generation module 140, in FIG. 1.

Figure 3:
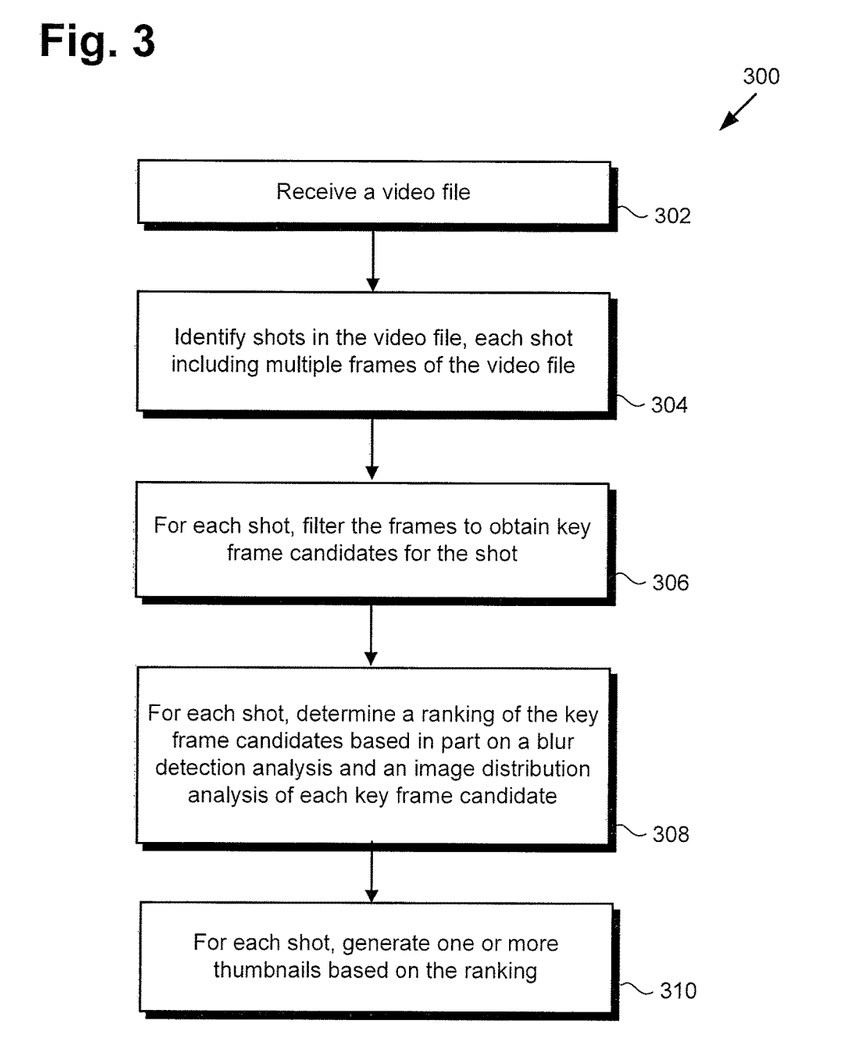
FIG. 3 shows a flowchart presenting an exemplary method for performing thumbnail generation, according to one implementation.
Figure 4:
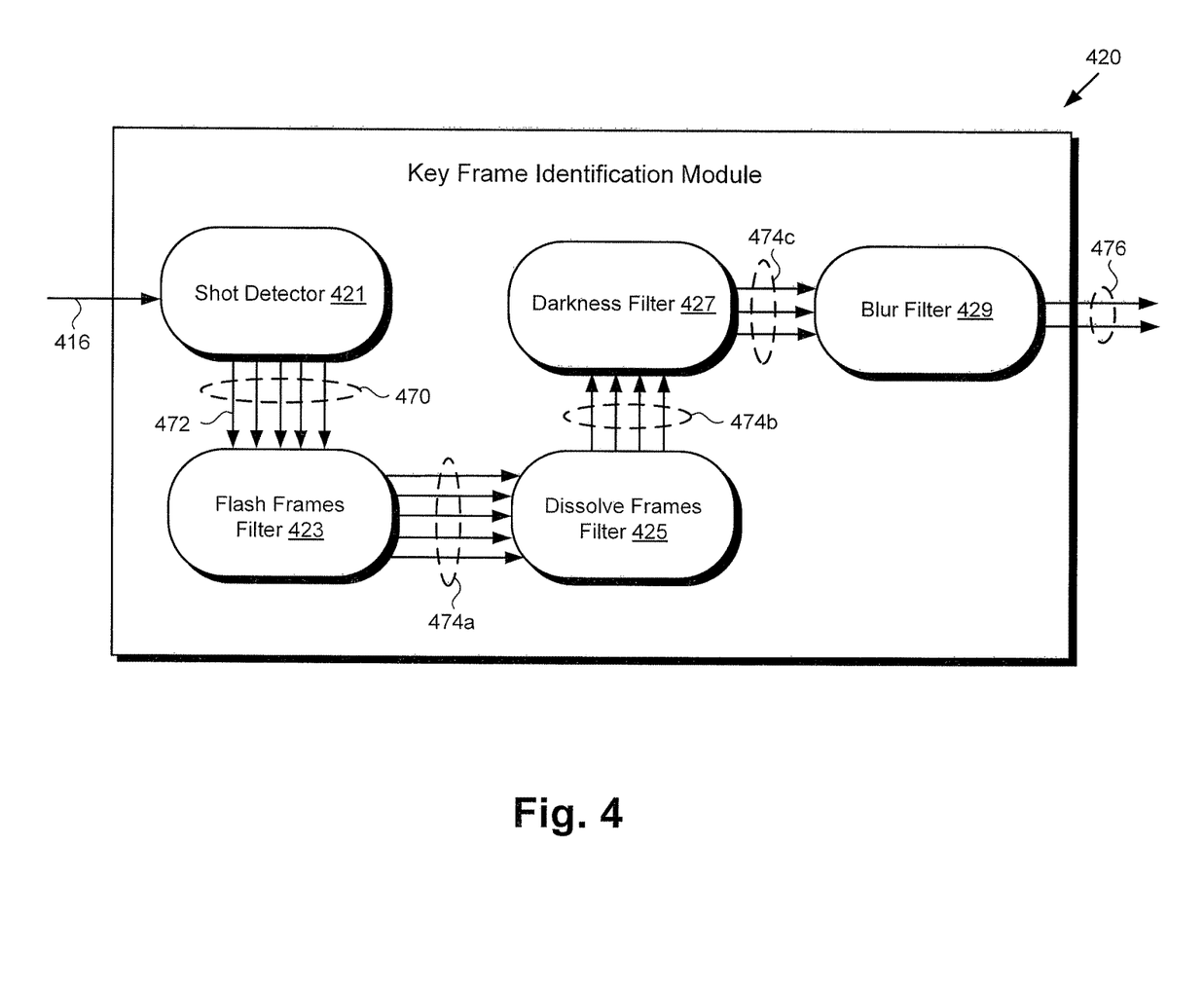
FIG. 4 shows an exemplary key frame identification module of a thumbnail generator software code suitable for execution by a hardware processor of the systems shown by FIGS. 1 and 2, according to one implementation.
Figure 5:
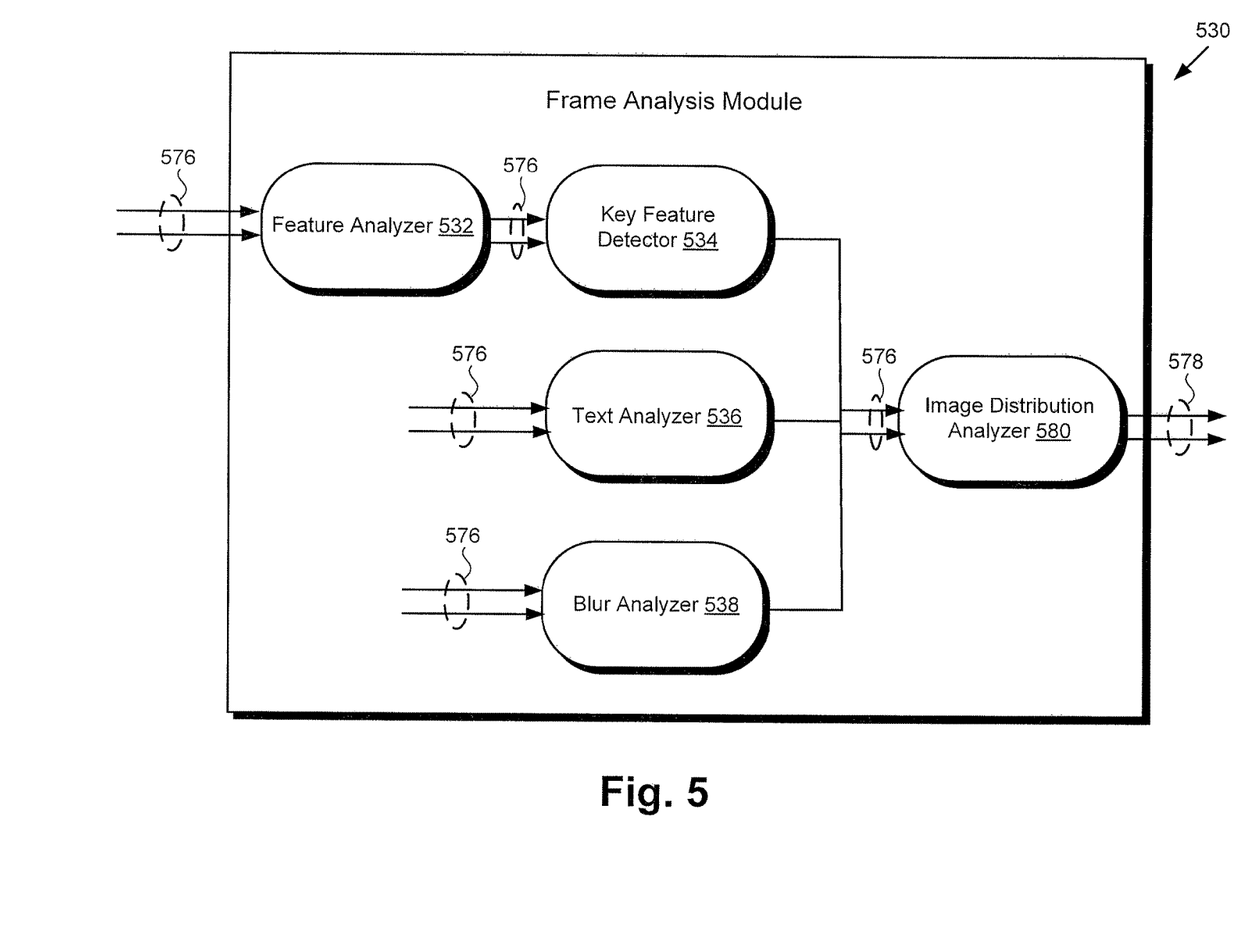
FIG. 5 shows an exemplary frame analysis module of a thumbnail generator software code suitable for execution by a hardware processor of the systems shown by FIGS. 1 and 2, according to one implementation.
Figure 6:
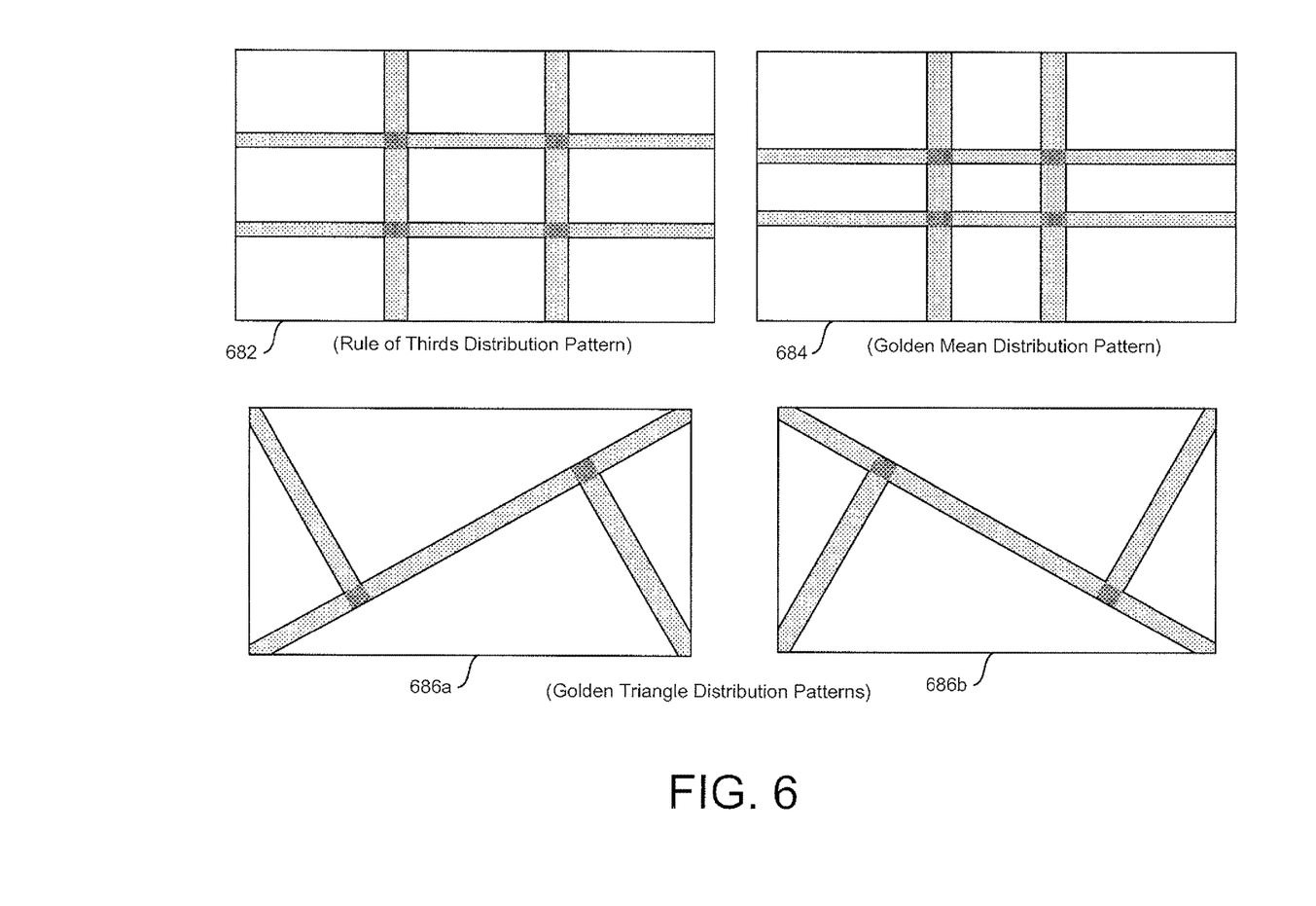
FIG. 6 shows exemplary predetermined distribution patterns suitable for use in ranking candidate key frames for thumbnail generation, according to one implementation.

The functionality of thumbnail generator software code 110/210 will be further described by reference to FIG. 3 in combination with FIGS. 1, 2, 4, 5, and 6. FIG. 3 shows flowchart 300 presenting an exemplary method for use by a system, such as video processing system 100, in FIG. 1, or system 260, in FIG. 2, to perform thumbnail generation. FIG. 4 shows exemplary key frame identification module 420 suitable for execution by hardware processor 104/264 as part of thumbnail generator software code 110/210, according to one implementation. FIG. 5 shows exemplary frame analysis module 530, also suitable for execution by hardware processor 104/264 as part of thumbnail generator software code 110/210, according to one implementation. FIG. 6 shows exemplary predetermined distribution patterns 682, 684, 686a, and 686b suitable for use in ranking candidate key frames for generation of thumbnail(s) 112, according to one implementation.

Referring now to FIG. 3 in combination with FIGS. 1 and 2, flowchart 300 begins with receiving video file 116 (action 302). By way of example, user 154 may utilize user device 150 to interact with video processing system 100 or system 260 in order to generate thumbnail(s) 112 representative of a shot in video file 116. As shown by FIG. 1, user 154 may do so by transmitting video file 116 from user device 150 to video processing system 100 via communication network 108 and network communication links 118. Alternatively, video file 116 may be received from a third party source of video content, or may reside as a stored video asset of system memory 106/266. Video file 116 may be received by thumbnail generator software code 110/210, executed by hardware processor 104/264.

Flowchart 300 continues with identifying shots in video file 116, each shot including multiple frames of video file 116 (action 304). As noted above, a "shot" refers to a sequence of frames within a video file that are captured from a unique camera perspective without cuts and/or other cinematic transitions. Thus, video file 116 includes multiple shots, with each shot including multiple frames, such as two or more shots, each including two or more frames, for example. Identification of shots in video file 116 may be performed by thumbnail generator software code 110/210, executed by hardware processor 104/264.

Referring to FIG. 4, FIG. 4 shows an exemplary implementation of key frame identification module 420 including shot detector 421, flash frames filter 423, dissolve frames filter 425, darkness filter 427, and blur filter 429. In addition, FIG. 4 shows video file 416, multiple shots 470 in video file 416, including shot 472, and multiple frames 474a, 474b, and 474c of shot 472 following filtering of shot 472 using respective flash frames filter 423, dissolve frames filter 425, and darkness filter 427. Also shown in FIG. 4 are multiple key frame candidates 476 provided by key frame identification module 420 as an output.

Video file 416 and key frame identification module 420 correspond respectively in general to video file 116 and key frame identification module 120 of thumbnail generator software code 110/210. Consequently, key frame identification modules 120 and 420 may share any of the characteristics attributed to either of those corresponding features by the present disclosure.

Identification of shots 470 in video file 116/416 may be performed by thumbnail generator software code 110/210, executed by hardware processor 104/264, and using shot detector 421 of key frame identification module 120/420. In some implementations, identifying discrete shots 470 of video file 116/416 may be based on detecting shot boundaries. For example, shot boundaries of shot 472 may include one or more of a starting frame of shot 472 and an ending frame of shot 472.

In some implementations, shot detector 421 may be configured to determine starting and/or ending frames based on triggers and/or other information contained in video file 116/416. Examples of triggers may include one or more of a fade-in transition, a fade-out transition, an abrupt cut, a dissolve transition, and/or other triggers associated with a shot boundary. In some implementations, recognizing triggers may be accomplished by shot detector 421 using image processing techniques such as comparing one or more frames within a given time window to determine an occurrence of significant changes. For example, determining that a significant change has occurred may be accomplished using a histogram of color for individual frames, direct comparison of frames, or by detecting chaotic optical flow.

In some implementations, shot detector 421 may be configured to identify shots 470 based on rank-tracing techniques. For example, rank-tracing may be accomplished by determining a histogram of frames of a video based on a hue-saturation-value (HSV) color space model of individual frames, a hue-saturation-lightness (HSL) color space model of individual frames, and/or based on other techniques for representing an RGB color model of a frame.

Flowchart 300 continues with, for each of shots 470, e.g., shot 472, filtering frames 474a, 474b, and 474c to obtain multiple key frame candidates 476 for shot 472 (action 306). Filtering of each of shots 470, such as shot 472, to obtain key frame candidates 476 for shot 472, may be performed by thumbnail generator software code 110/210, executed by hardware processor 104/264, and using flash frames filter 423, dissolve frames filter 425, darkness filter 427, and blur filter 429 of key frame identification module 120/420.

Referring to shot 472 of shots 470 for exemplary purposes, flash frames included among the frames of shot 472 can be immediately eliminated as potential key frame candidates 476 for shot 472 because they are not related to the content of video file 116/416. As a result, flash frames may be filtered out of the frames of shot 472 using flash frames filter 423, resulting in filtered frames 474a of shot 472.

Dissolve frames are the result of superimposing two different images, and are therefore unsuitable as key frame candidates 476 for generation of thumbnail(s) 112 for shot 472. Consequently, dissolve frames may be filtered out of frames 474a using dissolve frames filter 425. Dissolve frames may be filtered out of frames 474a using dissolve frames filter 425 by identifying portions of video file 116/416 in which the color of each pixel evolves in a nearly linear fashion along contiguous frames. Elimination of dissolve frames from frames 474a results in further filtered frames 474b of shot 472.

Frames that are dark are typically also not suitable as key frame candidates 476 for generation of thumbnail(s) 112 for shot 472. As a result, dark frames may be filtered out of frames 474b using darkness filter 427. Dark frames may be filtered out of frames 474b using darkness filter 427 through analysis of the light histogram for each of frames 474b. Those frames among frames 474b failing to meet a predetermined lightness threshold may be filtered out of frames 474b, resulting in yet further filtered frames 474c of shot 472.

Frames that are blurry are typically also not suitable as key frame candidates 476 for generation of thumbnail(s) 112 for shot 472 because they fail to clearly convey the subject matter of shot 472. As a result, blurry frames may be filtered out of frames 474c using blur filter 429.

Blurry frames may be filtered out of frames 474c using blur filter 429 by sampling at least some corners in the frame previous to the frame of interest, tracking the positions of those corners on the subsequent frame, i.e., the frame of interest, and determining a measure of blur based on the mean and variance of the magnitudes of the movement vectors of the corners. If the measure of blur is above a predetermined threshold, there are either too many points that move too fast, i.e., substantially the entire frame is blurry, or relatively few points move even faster, i.e., a local area of the frame is blurry. In either case, the blurry frame is filtered out and eliminated as a key frame candidate. It is noted that if the number of corners included in the frame is too small to perform the analysis, the frame may also be eliminated.

According to the exemplary implementation shown in FIG. 4, filtering of the frames of shot 472 by thumbnail generator software code 110/210, executed by hardware processor 104/264, and using flash frames filter 423, dissolve frames filter 425, darkness filter 427, and blur filter 429 of key frame identification module 120/420, obtains multiple key frame candidates 476 for use in generating one or more thumbnails 112 for shot 472. Thus, the filtering of the frames of shot 472 by thumbnail generator software code 110/210, executed by hardware processor 104/264, and using key frame identification module 120/420, substantially eliminates transition frames, dark frames, and blurred frames in obtaining key frame candidates 476 for shot 472. Similarly, others of shots 470 can be filtered using flash frames filter 423, dissolve frames filter 425, darkness filter 427, and blur filter 429 of key frame identification module 120/420 to substantially eliminate transition frames, dark frames, and blurred frames in obtaining key frame candidates for those respective shots.

Flowchart 300 continues with, for each of shots 470, e.g., shot 472, determining a ranking of key frame candidates 476 based in part on a blur detection analysis and an image distribution analysis of each key frame candidate (action 308). Referring to FIG. 5, FIG. 5 shows an exemplary implementation of frame analysis module 530 including feature analyzer 532, key feature detector 534, text analyzer 536, blur analyzer 538, and image distribution analyzer 580. In addition, FIG. 5 shows key frame candidates 576, and key frame ranking 578 determined following analysis of key frame candidates 576 using feature analyzer 532, key feature detector 534, text analyzer 536, blur analyzer 538, and image distribution analyzer 580.

Key frame candidates 576 and frame analysis module 530 correspond respectively in general to key frame candidates 476 and frame analysis module 130 of thumbnail generator software code 110/210. Consequently, frame analysis modules 130 and 530 may share any of the characteristics attributed to either of those corresponding features by the present disclosure. Determining key frame ranking 578 of key frame candidates 476/576 based in part on a blur detection analysis and an image distribution analysis of each of key frame candidates 476/576 may be performed by thumbnail generator software code 110/210, executed by hardware processor 104/264, and using frame analysis module 130/530.

Feature analyzer 532 of frame analysis module 130/530 may be configured to determine features of individual key frame candidates 476/576. For example, features of an individual key frame candidate may include one or more of a relative size, position, and/or angle of one or more individual faces depicted in the key frame candidate, a state of a mouth and/or eyes of a given face, an image quality, one or more actions that may be taking place, and one or more background features appearing in the key frame candidate. Actions taking place in key frame candidates 476/576 may include one or more of explosions, car chases, and/or other action sequences. Feature analyzer 532 may detect features in key frame candidates 476/576 using one or more of "speeded up robust features" (SURF), "scale-invariant feature transform" (SIFT), and/or other techniques.

In some implementations, feature analyzer 532 may be configured to detect one or more faces in individual key frame candidates and/or track individual faces over one or more frames. Face detection and/or tracking may be accomplished using object recognition, pattern recognition, searching for a specific pattern expected to be present in faces, and/or other image processing techniques. By way of example, face detection and/or tracking may be accomplished using a "sophisticated high-speed object recognition engine" (SHORE), Viola-Jones object detection framework, and/or other techniques.

Key feature detector 534 of frame analysis module 130/530 may be configured to determine which of the one or more features identified by feature analyzer 532 may be classified as important in a given key frame candidate. In some implementations, importance may correspond to a character's role in the video, and/or other measures of importance. A role may include one of a speaker, a listener, a primary actor, a secondary actor, a background actor, a temporary or transient actor, or an audience member or spectator, for example.

In some implementations, key feature detector 534 may be configured to determine the importance of a face based on various features of the given face, for example. In some implementations, one or more features of a face may include the determined relative position, size, and/or angle of a given face respect to the camera capturing the key frame candidate, the state of the mouth and the eyes, and/or whether the face is detected over multiple frames, for example.

As a specific example, key frame candidates 476/576 may include one or more characters speaking, one or more characters listening, and one or more persons acting as spectators to the speaking and listening. A given speaker and/or a given listener may be depicted in a key frame candidate as being positioned closer to the camera relative to the one or more spectators positioned in the background of the key frame candidate. Consequently, the speaker and/or listener may have face sizes that may be relatively larger than the face sizes of the one or more spectators. Key feature detector 534 may be configured to determine that the detected faces of the speaker and/or listener are a key feature or features having greater importance than the detected faces of the one or more spectators.

Text analyzer 536 of frame analysis module 130/530 may be configured to detect text displayed in key frame candidates 476/576. In some implementations, for example, text (e.g., a sentence and/or other text string) may be detected using text detection techniques such as Stroke Width Transform (SWT), high frequency analysis of the image including refinement stages based on machine learning, and/or other techniques.

Blur analyzer 538 of frame analysis module 130/530 may be configured to detect blurriness in key frame candidates 476/576 that is either too subtle or too localized to have been detected and filtered out using blur filter 429 of key frame identification module 120/420. Blurriness within key frame candidates 476/576 may be identified using blur analyzer 538 by detecting many or substantially all corners in the frame previous to the key frame candidate of interest, tracking the positions of those corners on the subsequent frame, i.e., the key frame candidate of interest, and determining a measure of blur based on the mean and variance of the magnitudes of the movement vectors of the corners.

Key frame ranking 578 of key frame candidates 476/576 is based at least in part on the blur detection analysis performed by blur analyzer 538 of frame analysis module 530. That is to say, the higher the measure of blur associated with a key frame candidate, the lower key frame ranking 578 of that particular key frame candidate would typically be, i.e., it would be ranked as relatively less desirable for use in generating thumbnail(s) 112.

Image distribution analyzer 580 of frame analysis module 130/530 may be configured to determine the desirability with which images, such as features, key features, and text, are distributed within each of key frame candidates 476/576. In some implementations, for example, the image distribution analysis performed by image distribution analyzer 580 of frame analysis module 130/530 may include evaluating the distribution of images in each of key frame candidates 476/576 relative to one or more predetermined distribution patterns.

Referring to FIG. 6, FIG. 6 shows exemplary predetermined distribution patterns 682, 684, and 686a and 686b suitable for use in ranking candidate key frames for thumbnail generation, according to one implementation. Predetermined distribution pattern 682 is a rule of thirds distribution pattern corresponding to the rule of thirds guideline for composing visual images. Predetermined distribution pattern 684 is a golden mean distribution pattern corresponding to the golden mean or golden ratio approach to proportioning an object or image. Predetermined distribution patterns 686a and 686b are golden triangle distribution patterns corresponding to the classical golden triangle rule of composition used in painting and photography.

Thus, the image distribution analysis of key frame candidates 476/576 performed by image distribution analyzer 580 of frame analysis module 130/530 may include evaluating the distribution of images in each of key frame candidates 476/576 relative to one or more of rule of thirds distribution pattern 682, golden mean distribution pattern 684, and golden triangle distribution patterns 686a and 686b. Key frame ranking 578 of key frame candidates 476/576 is based at least in part on the image distribution analysis performed by image distribution analyzer 580 of frame analysis module 530. That is to say, the more closely the distribution of images in a particular key frame candidate comports with one or more predetermined image distribution patterns, the higher key frame ranking 578 of that particular key frame candidate would typically be, i.e., it would be ranked as relatively more desirable for use in generating thumbnail(s) 112.

Flowchart 300 can conclude with, for each of shots 470, e.g., shot 472, generating at least one thumbnail 112(s) for shot 472 based on key frame ranking 578 (action 310). Generation of at least one thumbnail(s) 112 for shot 472 can be performed by thumbnail generator software code 110/210, executed by hardware processor 104/264, and using thumbnail generation module 140.

In some implementations, generation of at least one thumbnail(s) 112 can include improving the image quality of the key frame candidate(s) from which thumbnail(s) 112 is/are generated by cropping the key frame candidate(s) and/or by performing contrast enhancement of the key frame candidate(s). For example, the contrast of the thumbnail candidate(s) can be enhanced by equalizing its/their lightness histogram(s). However, it may be advantageous or desirable for only the region between two given percentiles to be equalized and adjusted to a new given range, whereas the lower and upper tails are linearly transformed to maintain the continuity of the pixels in the image. In other words, given $p_L$ and $p_U$, the lower and upper percentiles respectively, and $v_L$ and $v_U$, the new values to which such percentiles are to be mapped, the transformation function is given by Equation 1 as follows:

$$eq(x) = \begin{cases} \dfrac{x}{ppf(p_L)} \cdot v_L, & 0 \leq x \leq ppf(p_L) \\[1em] v_L + \dfrac{\sum_{y=ppf(p_L)+1}^{x} hist(y)}{\sum_{z=ppf(p_L)+1}^{ppf(p_U)} hist(z)} \cdot (v_U - v_L), & ppf(p_L) < x \leq ppf(p_U) \\[1em] v_U + \dfrac{x - ppf(p_U)}{v_U - ppf(p_U)} \cdot (100 - v_U), & ppf(p_U) < x \leq 100 \end{cases}$$

where ppf is the percent point function, also known as the quantile function, and hist is the histogram of the original image.

In some implementations, the exemplary method outlined in flowchart 300 may further include sending thumbnail(s) 112 to user device 150 including display 152. Sending of thumbnail(s) 112 to user device 150, may be performed by thumbnail generator software code 110/210, executed by hardware processor 104/264, for example by being transferred via network communication links 118 of communication network 108. In those implementations, key frame candidate ranking 578 of key frame candidates 476/576 for shot 472 may be determined based further in part on display attributes of the user device 150.

For example, when user device 150 takes the form of a mobile device, such as a smartphone, digital media player, or small form factor tablet computer, key frame candidates including relatively large features and relatively simple structures may be ranked more highly for generation of thumbnail(s) 112. By contrast, when user device 150 takes the form of a smart TV or PC, for example, key frame candidates including relatively smaller features and more complex layouts may be ranked more highly for generation of thumbnail(s) 112. Moreover, in any of those use cases, generation of thumbnail(s) 112 may include cropping the key frame candidate(s) used to produce thumbnail(s) 112 in order to fit the aspect ratio of display 152 of user device 150.

Thus, the present application discloses a thumbnail generation solution that substantially optimizes the selection and generation of one or more thumbnails corresponding respectively to one or more key frames of a shot within a video file. By ranking key frame candidates for a particular shot based in part on a blur detection analysis of each key frame candidate at multiple levels of granularity, the present application discloses a thumbnail generation solution that advantageously provides thumbnails including clear, recognizable images. In addition, by further ranking key frame candidates based in part on an image distribution analysis of each key frame candidate, the present application discloses a thumbnail generation solution that advantageously provides thumbnails including intuitively identifiable subject matter. Moreover, by yet further ranking key frame candidates based in part on display attributes of a user device, the present application discloses a thumbnail generation solution that advantageously provides thumbnails that are substantially optimized for inspection by a user.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
   a computing platform including a hardware processor and a system memory;
   a thumbnail generator software code stored in the system memory;
   the hardware processor configured to execute the thumbnail generator software code to:
   receive a video file;
   identify a plurality of shots in the video file, each of the plurality of shots including a plurality of frames of the video file; and
   for each of the plurality of shots:

filter the plurality of frames to obtain a plurality of key frame candidates;
determine a ranking of the plurality of key frame candidates based in part on a blur detection analysis and an image distribution analysis of each of the plurality of key frame candidates, wherein the image distribution analysis determines how closely a pattern of distribution of images within each of the plurality of key frame candidates comports with a predetermined distribution pattern, and wherein the closer the pattern of distribution of images within a key frame candidate is to the predetermined distribution pattern, the higher is the ranking of the key frame candidate; and
generate a thumbnail based on the ranking.

2. The video processing system of claim 1, wherein the hardware processor is further configured to execute the thumbnail generator software code to send the thumbnail to a user device including a display.

3. The video processing system of claim 2, wherein the ranking of the plurality of key frame candidates is determined based further in part on display attributes of the user device.

4. The video processing system of claim 1, wherein the predetermined distribution pattern includes one or more of a rule of thirds distribution pattern, a golden mean distribution pattern, and a golden triangle distribution pattern.

5. The video processing system of claim 1, wherein the hardware processor is configured to execute the thumbnail generator software code to generate the thumbnail by performing at least one of a cropping and a contrast enhancement of a respective at least one of the plurality of key frame candidates corresponding to the thumbnail.

6. The video processing system of claim 1, wherein the hardware processor is configured to execute the thumbnail generator software code to filter the plurality of frames to substantially eliminate transition frames, dark frames, and blurred frames in order to obtain the plurality of key frame candidates.

7. A method for use by a video processing system including a computing platform having a hardware processor and a system memory storing a thumbnail generator software code for execution by the hardware processor, the method comprising:
receiving, using the hardware processor, a video file;
identifying, using the hardware processor, a plurality of shots in the video file,
each of the plurality of shots including a plurality of frames of the video file; and
for each of the plurality of shots:
filtering, using the hardware processor, the plurality of frames to obtain a plurality of key frame candidates;
determining, using the hardware processor, a ranking of the plurality of key frame candidates based in part on a blur detection analysis and an image distribution analysis of each of the plurality of key frame candidates, wherein the image distribution analysis determines how closely a pattern of distribution of images within each of the plurality of key frame candidates comports with a predetermined distribution pattern, and wherein the closer the pattern of distribution of images within a key frame candidate is to the predetermined distribution pattern, the higher is the ranking of the key frame candidate; and
generating, using the hardware processor, a thumbnail based on the ranking.

8. The method of claim 7, further comprising sending, using the hardware processor, the thumbnail to a user device including a display.

9. The method of claim 8, wherein the ranking of the plurality of key frame candidates is determined based further in part on display attributes of the user device.

10. The method of claim 7, wherein the predetermined distribution pattern includes one or more of a rule of thirds distribution pattern, a golden mean distribution pattern, and a golden triangle distribution pattern.

11. The method of claim 7, wherein generating the thumbnail includes performing at least one of a cropping and a contrast enhancement of a respective one of the plurality of key frame candidates corresponding to the thumbnail.

12. The method of claim 7, wherein the hardware processor filters the plurality of frames to substantially eliminate transition frames, dark frames, and blurred frames in order to obtain the plurality of key flume candidates.

13. A video processing system comprising:
a computing platform including a hardware processor and a system memory;
a thumbnail generator software code stored in the system memory;
the hardware processor configured to execute the thumbnail generator software code to:
obtain display attributes of a user device;
receive a video file;
identify a plurality of shots in the video file, each of the plurality of shots including a plurality of frames of the video file; and
for each of the plurality of shots:
filter the plurality of frames to obtain a plurality of key frame candidates;
determine a ranking of the plurality of key frame candidates based in part on a blur detection analysis, display attributes of the user device, and an image distribution analysis of each of the plurality of key frame candidates, wherein the image distribution analysis determines how closely a pattern of distribution of images within each of the plurality of key frame candidates comports with a predetermined distribution pattern, and wherein the closer the pattern of distribution of images within a key frame candidate is to the predetermined distribution pattern, the higher is the ranking of the key frame candidate; and
generate a thumbnail based on the ranking.

14. The video processing system of claim 13, wherein the hardware processor is further configured to execute the thumbnail generator software code to send the thumbnail to a display of the user device.

15. The video processing system of claim 13, wherein the predetermined distribution pattern includes one or more of a rule of thirds distribution pattern, a golden mean distribution pattern, and a golden triangle distribution pattern.

16. The video processing system of claim 13, wherein the hardware processor is configured to execute the thumbnail generator software code to generate the thumbnail by performing at least one of a cropping and a contrast enhancement of a respective at least one of the plurality of key frame candidates corresponding to the thumbnail.

17. The video processing system of claim 13, wherein the hardware processor is configured to execute the thumbnail generator software code to filter the plurality of frames to substantially eliminate transition frames, dark frames, and blurred frames in order to obtain the plurality of key frame candidates.

\* \* \* \* \*

UNITED STATES PATENT AND TRADEMARK OFFICE
CERTIFICATE OF CORRECTION

PATENT NO. : 10,068,616 B2  
APPLICATION NO. : 15/404028  
DATED : September 4, 2018  
INVENTOR(S) : Farre Guiu et al.

Page 1 of 1

It is certified that error appears in the above-identified patent and that said Letters Patent is hereby corrected as shown below:

In the Claims

Column 12, Line 18, "key flume candidates" should be --key frame candidates--

Signed and Sealed this
Twenty-eighth Day of May, 2019

Andrei Iancu
*Director of the United States Patent and Trademark Office*